United States Patent
Honda et al.

(10) Patent No.: US 10,931,535 B2
(45) Date of Patent: Feb. 23, 2021

(54) STORAGE FORM SEARCHING DEVICE, STORAGE FORM SEARCHING METHOD, AND PROGRAM

(71) Applicant: NIPPON TELEGRAPH AND TELEPHONE CORPORATION, Chiyoda-ku (JP)

(72) Inventors: Hirotada Honda, Musashino (JP); Hiroshi Saito, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/339,904

(22) PCT Filed: Aug. 17, 2017

(86) PCT No.: PCT/JP2017/029529
§ 371 (c)(1),
(2) Date: Apr. 5, 2019

(87) PCT Pub. No.: WO2018/074043
PCT Pub. Date: Apr. 26, 2018

(65) Prior Publication Data
US 2020/0044932 A1 Feb. 6, 2020

(30) Foreign Application Priority Data
Oct. 21, 2016 (JP) .............................. JP2016-206950
Apr. 21, 2017 (JP) .............................. JP2017-084161

(51) Int. Cl.
*H04L 12/24* (2006.01)
*H04L 12/46* (2006.01)
(Continued)

(52) U.S. Cl.
CPC .......... *H04L 41/12* (2013.01); *H04L 12/4641* (2013.01); *H04L 41/02* (2013.01); *H04L 45/42* (2013.01); *H04L 45/586* (2013.01)

(58) Field of Classification Search
CPC ..... G06F 21/56; H04L 12/4641; H04L 41/02; H04L 41/0816; H04L 41/12;
(Continued)

(56) References Cited

U.S. PATENT DOCUMENTS

2015/0195190 A1* 7/2015 Shah Heydari ......... H04L 45/28
714/47.3
2018/0367608 A1* 12/2018 Miyaki ............... H04L 67/1061

FOREIGN PATENT DOCUMENTS

JP        2015-198401 A        11/2015

OTHER PUBLICATIONS

International Search Report dated Nov. 7, 2017 in PCT/JP2017/029529 filed Aug. 17, 2017.
(Continued)

*Primary Examiner* — Kashif Siddiqui
(74) *Attorney, Agent, or Firm* — Oblon, McClelland, Maier & Neustadt, L.L.P.

(57) ABSTRACT

A storage form searching device includes a calculator configured to calculate a failure rate of each physical link constituting a physical network based on information representing a disaster-affected area; and a searcher configured to search for a storage form for one or more stored networks stored in a logical network configured by using the physical network, wherein the storage form makes a cut-off rate calculated based on the failure rate of said each physical link smaller, so as to improve controllability of the stored network with respect to a disaster.

8 Claims, 13 Drawing Sheets

(51) Int. Cl.
*H04L 12/717* (2013.01)
*H04L 12/713* (2013.01)

(58) Field of Classification Search
CPC .............. H04L 43/0823; H04L 43/0876; H04L 43/0894; H04L 45/42; H04L 45/586
See application file for complete search history.

(56) References Cited

OTHER PUBLICATIONS

Haider, A. et al., "Recovery Techniques in Next Generation Networks," IEEE Communications Surveys, vol. 9, No. 3, 2007, pp. 2-17.

Smith, D. R. et al., "Contingency/Disaster Recovery Planning for Transmission Systems of the Defense information System Network," IEEE Journal on Selected Areas in Communications, vol. 12, No. 1, Jan. 1, 1994, pp. 13-22.

Tsukuda, M. et al., "SDN Technology for Carrier Network and Its Network Management," Transactions of the Institute of Electronics, Information and Communication Engineers, vol. 96, No. 12, Dec. 2013, pp. 926-930.

Saito, H., "Spatial Design of Physical Network Robust Against Earthquakes," Journal of Lightwave Technology, vol. 33, No. 2, 2015, pp. 443-458, <https://www.osapublishing.org/jltla bstract.cfm?uri=jlt-33-2-443>.

Ikeda, Y. et al., "Generating a network reliability formula by using binary decision diagrams," IEICE Communications Express, vol. 4, No. 9, Sep. 29, 2015, pp. 299-303, <https://www.researchgate.net/profile/Hiroshi_Saito7/publication/282432618_Generating_a_network_reliability_formula_by_using_binary_decision_diagrams/links/596791de458515c212b44929/Generating-a-network-reliability-formula-by-using•binary-decision-diagrams.pdf?origin=publication_detail>.

* cited by examiner

FIG.9

| NUMBER | 0-1 | 1-2 | 2-3 | 3-4 | 4-0 | CONDUCTION |
|---|---|---|---|---|---|---|
| 1 | ○ | ○ | ○ | ○ | ○ | ○ |
| 2 | ○ | ○ | ○ | ○ | × | ○ |
| 3 | ○ | ○ | ○ | × | ○ | ○ |
| 4 | ○ | ○ | ○ | × | × | × |
| 5 | ○ | ○ | × | ○ | ○ | ○ |
| 6 | ○ | ○ | × | ○ | × | × |
| 7 | ○ | ○ | × | × | ○ | × |
| 8 | ○ | ○ | × | × | × | × |
| 9 | ○ | × | ○ | ○ | ○ | ○ |
| 10 | ○ | × | ○ | ○ | × | × |
| 11 | ○ | × | ○ | × | ○ | ○ |
| 12 | ○ | × | ○ | × | × | × |
| 13 | ○ | × | × | ○ | ○ | ○ |
| 14 | ○ | × | × | ○ | × | × |
| 15 | ○ | × | × | × | ○ | ○ |
| 16 | ○ | × | × | × | × | × |
| 17 | × | ○ | ○ | ○ | ○ | ○ |
| 18 | × | ○ | ○ | ○ | × | × |
| 19 | × | ○ | ○ | × | ○ | ○ |
| 20 | × | ○ | ○ | × | × | × |
| 21 | × | ○ | × | ○ | ○ | ○ |
| 22 | × | ○ | × | ○ | × | × |
| 23 | × | ○ | × | × | ○ | ○ |
| 24 | × | ○ | × | × | × | × |
| 25 | × | × | ○ | ○ | ○ | ○ |
| 26 | × | × | ○ | ○ | × | × |
| 27 | × | × | ○ | × | ○ | ○ |
| 28 | × | × | ○ | × | × | × |
| 29 | × | × | × | ○ | ○ | ○ |
| 30 | × | × | × | ○ | × | × |
| 31 | × | × | × | × | ○ | ○ |
| 32 | × | × | × | × | × | × |

FIG.10
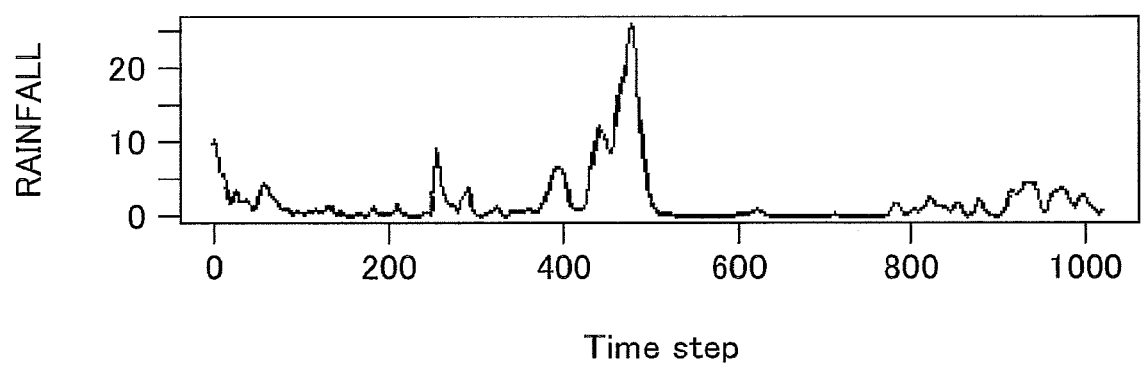
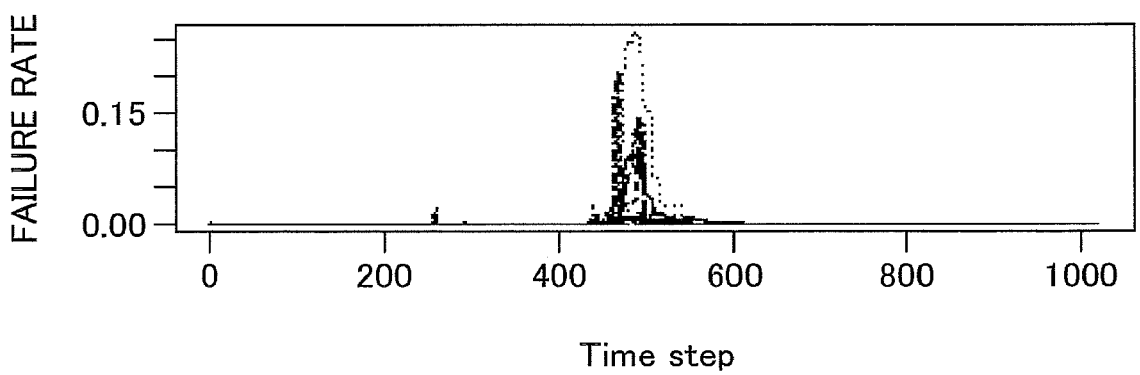

US 10,931,535 B2

STORAGE FORM SEARCHING DEVICE, STORAGE FORM SEARCHING METHOD, AND PROGRAM

TECHNICAL FIELD

The present invention relates to a storage form searching device, a storage form searching method, and a program.

BACKGROUND ART

Regarding a network, in preparation for disasters, two types of methods are used, which are advance measures and post-measures. The advance measures are methods based on a design of facilities, such as a method of designing and deploying facilities by taking account of failures upon disasters, so that even if one device is damaged to become inoperative, the network can remain functional as long as another device is operative. The post-measures are methods based on avoidance control, in which a network is controlled for maintaining functions expected as the network, by switching to a standby device, and/or changing server functions and/or arrangement of paths so as to flow a part of the traffic to other paths.

These techniques simply apply methods of high reliability for coping with unpredictable events such as failures to an occurrence of a disaster, and are not methods used exclusively for an occurrence of a disaster (see, e.g., Non-Patent Documents 1 and 2).

RELATED ART DOCUMENTS

Non-Patent Documents

Non-Patent Document 1: Aun Haider and Richard Harris, "Recovery Techniques in Next Generation Networks", IEEE Communications Surveys, 9, 3, 2007

Non-Patent Document 2: David R. Smith, Walter J. Cybrowski, Frank Zawislan, Donald Arnstein, Allen D. Dayton, and Theodore D. Studwell, "Contingency/Disaster Recovery Planning for Transmission Systems of the Defense Information System Network", IEEE Journal on Selected Areas in Communications, 12, 1, 1994

Non-Patent Document 3: Tsukuda Masanobu, Sato Yoichi, "SDN Technology for Carrier Network and Its Network Management", Journal of the Institute of Electronics, Information, and Communication Engineers, 96, 12, 2013

SUMMARY OF INVENTION

Problem to be Solved by the Invention

Progress of meteorology and the like enables to forecast disasters such as typhoons and tsunamis. Also, local governments have made hazard maps and the like available in preparation for disasters, and now provide information on anticipated damage when disasters occur. However, it is difficult to say that these circumstances are utilized in improving disaster tolerance of networks.

Further, while progress of network virtualization technologies (e.g., Non-Patent Document 3) expands the degree of freedom to control a network, issues have arisen in disaster tolerance of a virtual network stored in a physical network and a logical network, and in disaster tolerance of a control system (e.g., a controller) of a virtual network.

The present invention has been made in view of the above respects, and aims at improving controllability of a stored network against a disaster.

Means for Solving the Problem

Thereupon, in order to solve the problems described above, a storage form searching device includes a calculator configured to calculate a failure rate of each physical link constituting a physical network based on information representing a disaster-affected area; and a searcher configured to search for a storage form for one or more stored networks stored in a logical network configured by using the physical network, wherein the storage form makes a cut-off rate calculated based on the failure rate of said each physical link smaller.

Advantage of the Invention

It is possible to improve controllability of a stored network against a disaster.

BRIEF DESCRIPTION OF DRAWINGS

FIG. 9 is a diagram illustrating an example of enumeration of failure occurrence patterns of physical links on a physical network;

FIG. 10 is a diagram illustrating rainfall changing in time and failure rates of physical links changing in time according to a specific example;

EMBODIMENTS OF THE INVENTION

In the following, embodiments of the present invention will be described with reference to the drawings. In the present embodiments, a physical network means a physical network that is constituted with conduits, optical fiber cables, and the like; and a logical network means a logical network that is logically configured or connected by using devices or facilities on a physical network. Also, in both a physical network and a logical network, nodes constituting the network are roughly divided into relay nodes that are responsible only for data transfer, and server nodes that are computer resources that have servers and/or virtual machines installed.

Figure 1:
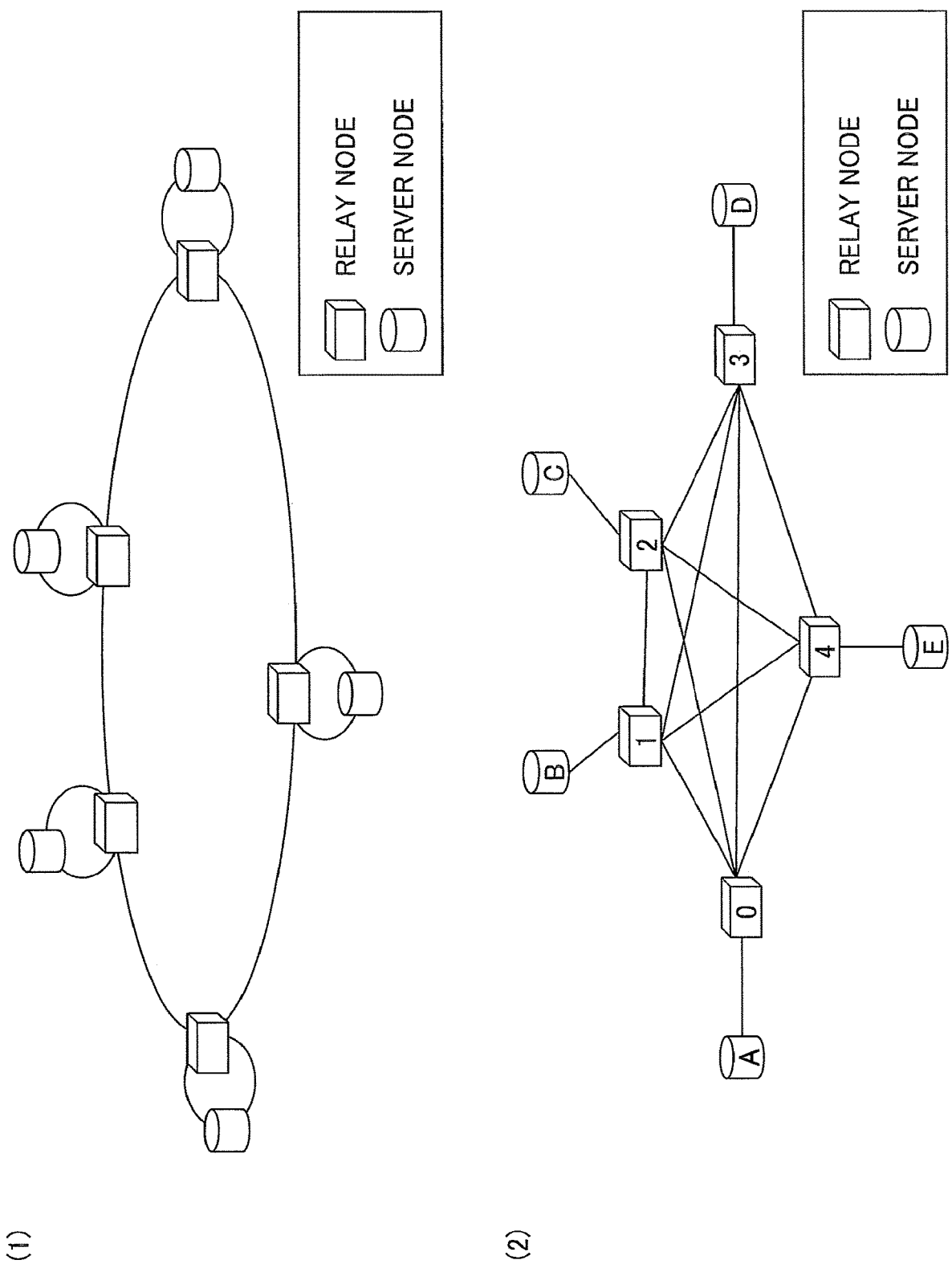
FIG. 1 is a diagram illustrating an example of a physical network and a logical network.

FIG. 1 is a diagram illustrating an example of a physical network and a logical network. In FIG. 1, (1) illustrates a physical network in which five relay nodes are deployed on a ring network, and on each sub-ring derived from each of the relay nodes, one server node is installed. Also, (2) illustrates a logical network that is configured based on availability of connectivity on the physical network of (1) and logical constraints. Note that for the sake of convenience of later description, numbers are assigned to the respective relay nodes on the logical network, and alphabet letters are assigned to the respective server nodes.

In the present embodiment, a virtual network means a network virtually implemented on a logical network upon a request from a user, in which a certain service is provided in a closed form within the network. In a request from the user, for example, a requested bandwidth, a server function, and the like are specified. A path that can satisfy such requirements on the logical network is allocated on the logical network as a virtual network. Therefore, the virtual network is constituted with a server function arranged on the server nodes on the logical network, and a path through the server nodes and the relay nodes stored in the logical network. As an example of the virtual network, a VPN (Virtual Private Network) may be considered.

Note that as a network stored in a logical network, in the present embodiment, a virtual network, a control-system-type virtual network, a control-system-type logical network, or the like may be considered. A control-system-type virtual network is a virtual network for controlling another virtual network. In other words, the virtual network is a virtual network that is stored in a logical network upon a request from the user, whereas the control-system-type virtual network is a virtual network, for example, that is assigned to the logical network by a network provider to control the user-requested virtual network. Also, as an example of the control-system-type logical network, a logical network that constitutes an OpenFlow controller, an orchestrator or the like that controls and manages allocation of resources of the physical network, and the like may be considered. When not distinguishing a control-system-type virtual network from a control-system-type logical network, it will be referred to as a "control network", below. Also, when not distinguishing a virtual network from a control network, it will be referred to as a "stored network". In other words, the stored network is a generic term of a network that can be stored in a logical network.

Note that in the following, although an example of optimizing a geographical configuration for achieving optimization of disaster tolerance of a stored network will be described, the present embodiment may be applied to a control-system-type physical network.

Figure 2:
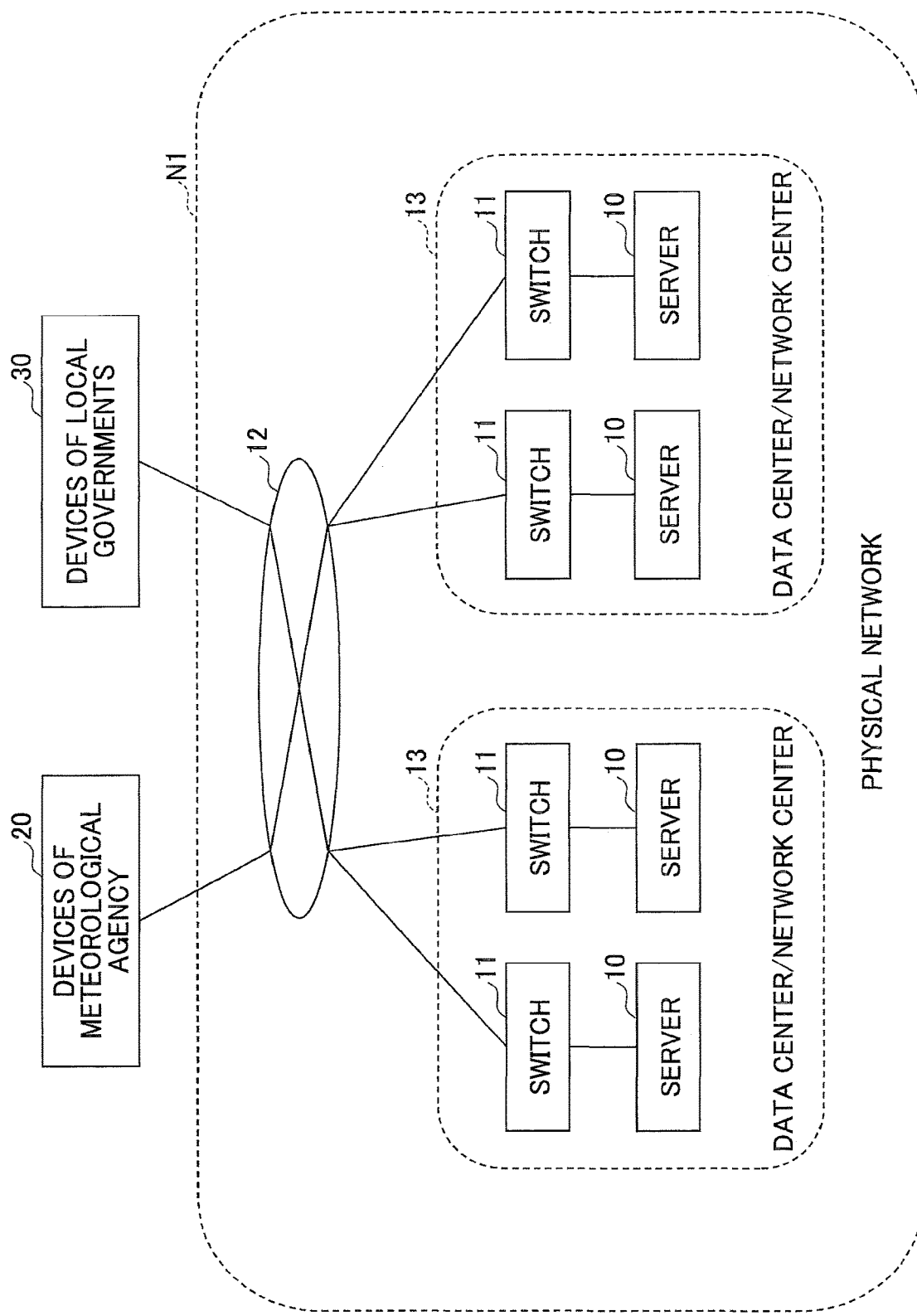
FIG. 2 is a diagram illustrating an example of a system configuration according to a first embodiment.

FIG. 2 is a diagram illustrating an example of a system configuration according to a first embodiment. The system illustrated in FIG. 2 includes metrological agency devices 20, local government devices 30, and a physical network N1. The physical network N1 includes a conduit network 12 and multiple data centers (or network centers) 13 connected by the conduit network 12. Each data center (or network center) 13 includes multiple switches 11 and servers 10. The switch 11 functions as a relay node. The server 10 functions as a server node.

Figure 3:
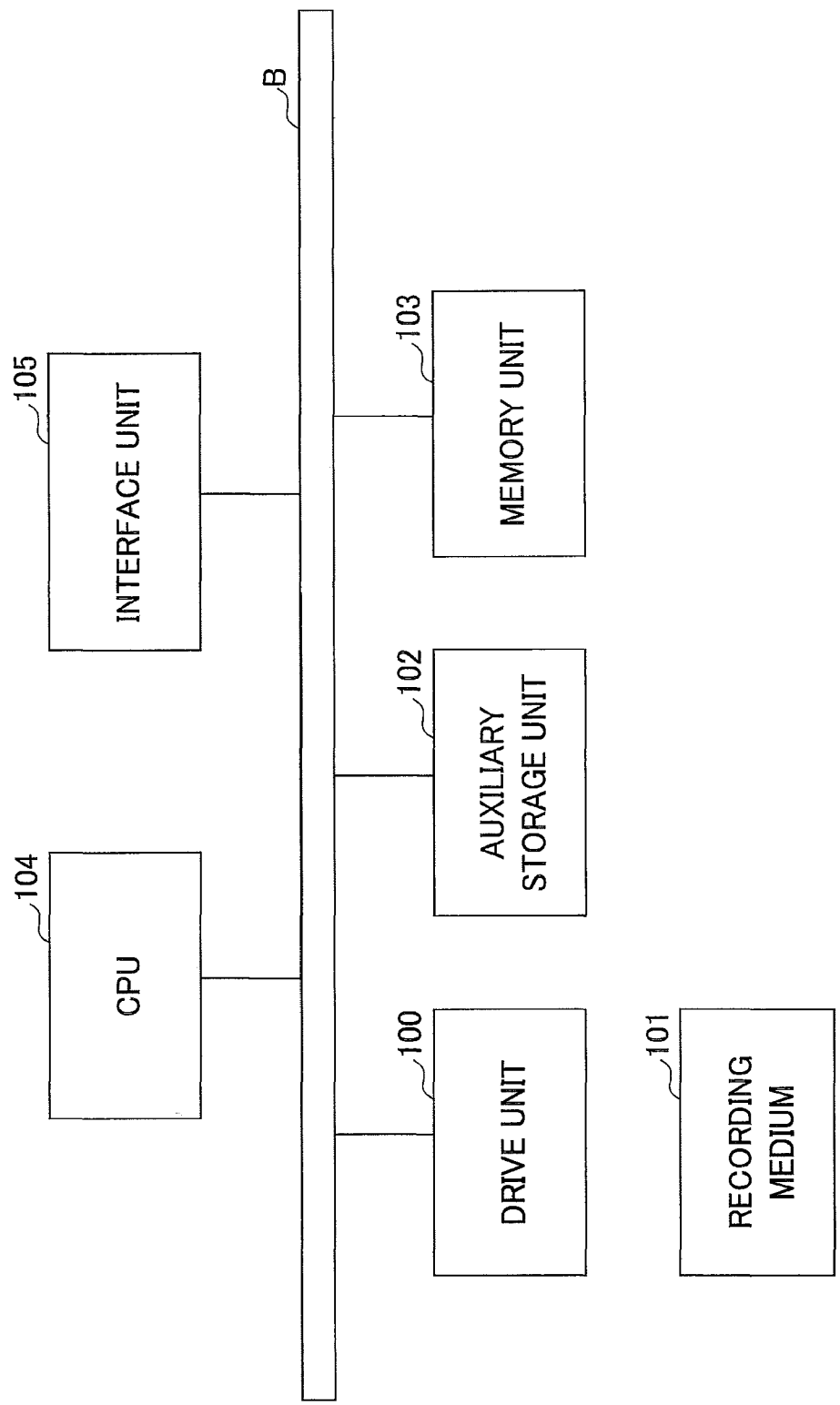
FIG. 3 is a diagram illustrating an example of a hardware configuration of each server 10 according to the first embodiment.

FIG. 3 is a diagram illustrating an example of a hardware configuration of each server 10 according to the first embodiment. The server 10 in FIG. 3 includes a drive unit 100, an auxiliary storage unit 102, a memory unit 103, a CPU 104, and an interface unit 105, which are mutually connected via a bus B.

A program that implements processing on the server 10 is provided with a recording medium 101 such as a CD-ROM. Once the recording medium 101 storing the program is set in the drive unit 100, the program is installed into the auxiliary storage unit 102 from the recording medium 101 via the drive unit 100. However, installation of the program is not necessarily executed from the recording medium 101, and may also be downloaded from another computer via the network. The auxiliary storage unit 102 stores the installed program, and stores required files, data, and the like as well.

Upon receiving a command to activate the program, the memory unit 103 reads out the program from the auxiliary storage unit 102, to load the program. The CPU 104 executes a function related to the server 10 according to the program loaded in the memory unit 103. The interface unit 105 is used as an interface for connecting with a network.

In the present embodiment, the operation center 110 is configured by using one or more servers 10 that have a hardware configuration as illustrated in FIG. 3.

Figure 4:
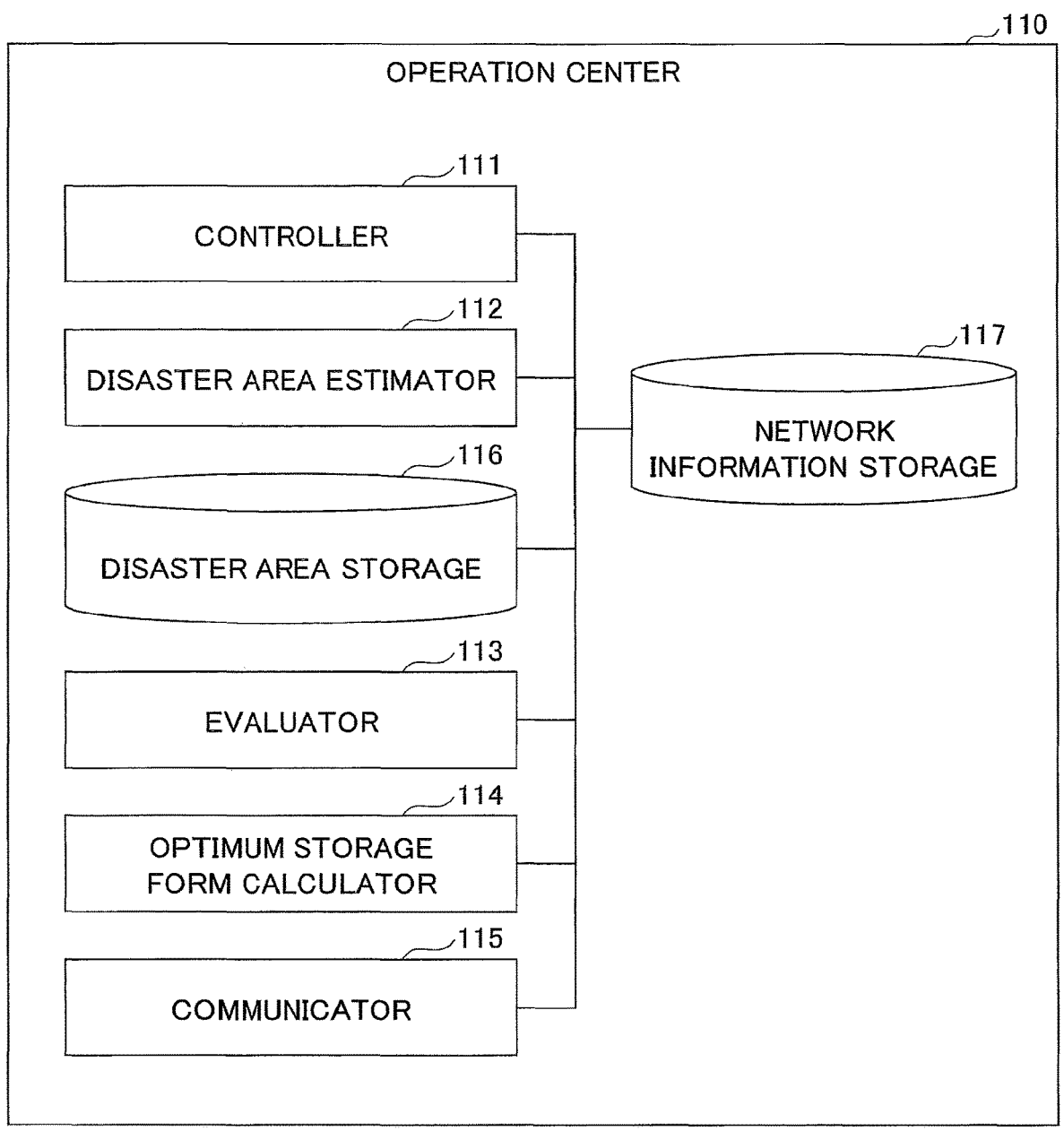
FIG. 4 is a diagram illustrating an example of a software configuration of an operation center 110 according to the first embodiment.

FIG. 4 is a diagram illustrating an example of a software configuration of the operation center 110 according to the first embodiment. In FIG. 4, the operation center 110 includes a controller 111, a disaster area estimator 112, an evaluator 113, an optimum storage form calculator 114, a communicator 115, and the like. These units are implemented by processes which one or more programs installed in one or more of the servers 10 cause the CPU 104 of the server to execute. The operation center 110 also includes a disaster area storage 116 and a network information storage 117. These storages can be implemented by using, for example, the auxiliary storage unit 102 or the like of one or more of the servers 10.

The network information storage 117 stores the topology of the physical network; the bandwidth of each physical link constituting the physical network; the topology of the logical network; the available bandwidth and latency of each link of the logical network; the CPU, the memory and storage capacity of each server node; the storage form (topology) of each stored network stored in the logical network; the requested bandwidth of each stored network; and the like.

The controller 111 functions as a stored network controller that controls the arrangement (storage) of the stored network with respect to the logical network. In the present embodiment, an example will be described in which the stored network controller is divided into two for an active system and a standby system, but the configuration of the stored network controller is not limited as such. Also, the stored network controller is connected to the virtual network to be controlled via a control network. Note that the stored network controller in the active system (active stored network controller) is connected with stored networks (control networks and virtual networks) in the active system. A stored network controller in the standby system (standby stored network controller) is connected with stored networks (control networks and virtual networks) in the standby system. Also, the stored network controller itself constitutes a control network. In other words, the stored network controller is stored in a control network to be configured.

Other functions of the controller 111 and functions of the other units will be clarified when describing processing steps.

Figure 5:
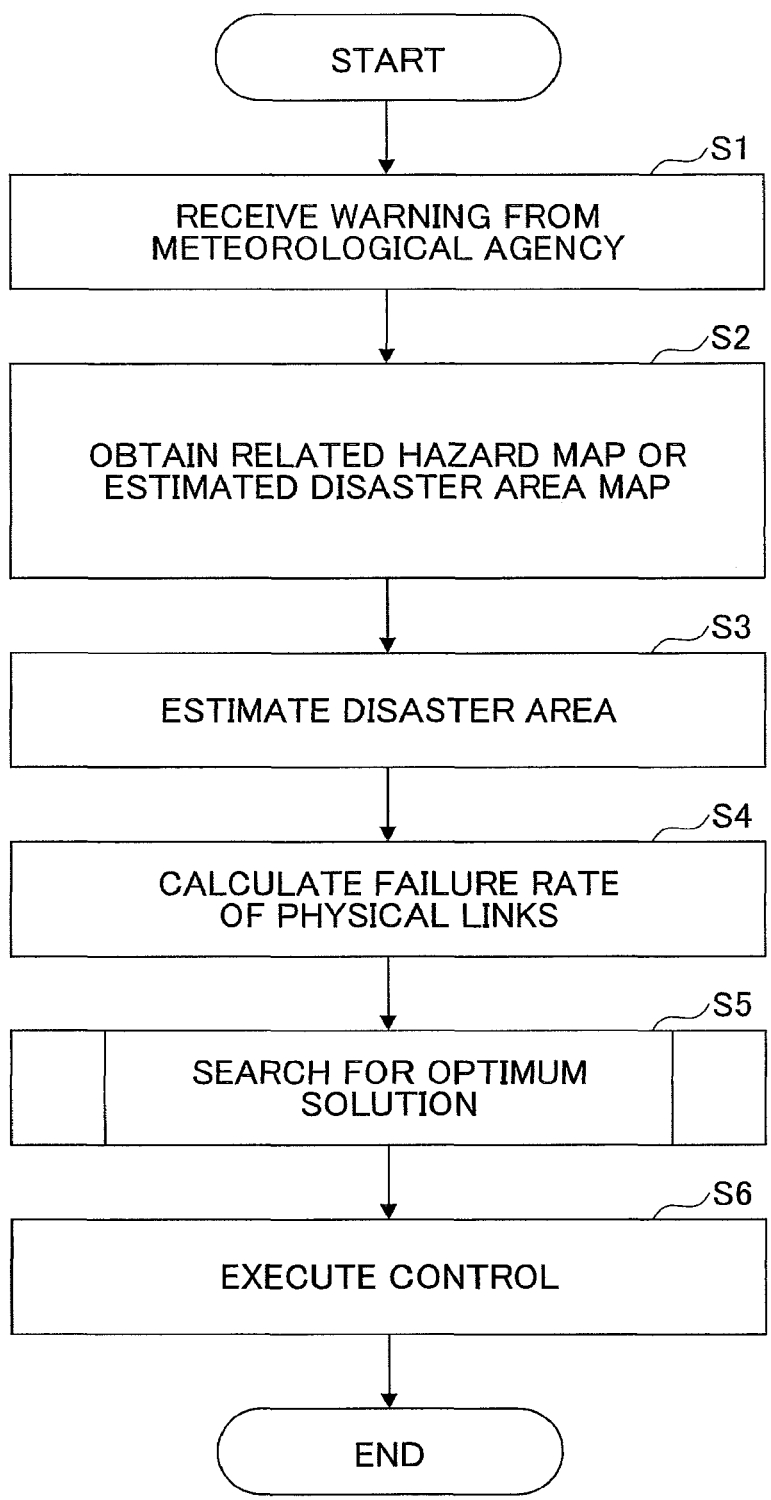
FIG. 5 is a flowchart for describing an example of processing steps executed in the operation center 110 according to the first embodiment.

In the following, processing steps executed in the operation center 110 will be described. FIG. 5 is a flowchart for describing an example of processing steps executed in the operation center 110 according to the first embodiment.

At Step S1, the communicator 115 receives a warning such as a weather warning transmitted from the meteorological agency device 20. The meteorological agency device 20 transmits a warning when, for example, an occurrence of a disaster is anticipated.

Note that although in the present embodiment, as an example, a case where a warning of a meteorological agency is issued is described, the warning is not necessarily limited to this example, and it is possible to use disaster prediction information that is distributed or a weather forecast may be used.

Next, the controller 111 identifies the warning type, warning level, and warning target area with respect to the received warning, and based on these, accesses respective local government devices 30 related to the warning via the communicator 115, to obtain the latest related hazard maps or estimated disaster area maps of the target areas (S2). The respective local government devices 30 related to the warning mean the local government devices 30 in a region as the target of the warning. Note that the controller 111 may access the respective local government devices 30 via the communicator 115 in advance to obtain hazard maps or estimated disaster area maps of the respective areas, so as to store the obtained hazard maps or estimated disaster area maps in the disaster area storage 116. In this case, at Step S2, the related hazard maps or estimated disaster area maps of the target areas of the warning may be obtained from the disaster area storage 116.

Next, the disaster area estimator 112 estimates disaster-affected areas based on the related hazard maps or estimated disaster area maps (S3). Information representing the estimated disaster-affected area (estimated disaster area) is stored in the disaster area storage 116. In the case where only the related hazard maps are obtained, the disaster area estimator 112 estimates disaster-affected areas in the target region based on the related hazard maps. Although the estimation method of disaster-affected areas is not limited to a specific one; for example, the disaster-affected areas included in the related hazard maps may be used as the estimated disaster areas as they are. Alternatively, level-specified disaster-affected areas in the related hazard maps may be selected as the estimated disaster areas with a predetermined probability.

Next, based on the information stored in the network information storage 117 and the estimated affected areas stored in the disaster area storage 116, the evaluator 113 evaluates (calculates) a failure rate 1510 of each physical link constituting the physical network N1 (S4). The failure rate of a physical link refers to a probability that communication using the physical link is disabled due to a failure of the physical link. Regarding the calculation method of this value, for example, "H. Saito, Spatial Design of Physical Network Robust against Earthquakes, Journal of Lightwave Technology 33 (2015), 443-458."; "Y. Ikeda, R. Kawahara and H. Saito, Generating a network reliability formula by using binary decision diagram, IEICE Communications Express 4 (2015), 299-303"; and the like may be referred to.

Next, the optimum storage form calculator 114 searches for (calculates), based on the failure rate 1510 of each physical link, for each stored network, a storage form (path) that makes the influence of the disaster as the target of the warning as small as possible (S5). The search result is referred to as an "optimum storage form 1540", below.

Next, the controller 111 executes control for rearrangement with respect to each of the stored networks to be rearranged in the optimum storage form 1540 calculated by the optimum storage form calculator 114 (S6). In the present embodiment, the rearrangement of a stored network refers to changing the arrangement of a server function (server node), a relay node, a path, and the like included in the stored network. Note that at this time, the stored network controller may execute switching from the active system to the standby system. In this case, data and the like of the active stored network controller are transferred to the standby stored network controller. The method of executing the transfer may follow a known technique. For example, the transfer can be easily implemented by using techniques such as an SDN controller, OpenStack, and the like, or a combination of these.

Next, processing contents executed by the optimum storage form calculator 114 at Step S5 will be described in detail. First, a functional configuration of the optimum storage form calculator 114 will be described.

Figure 6:
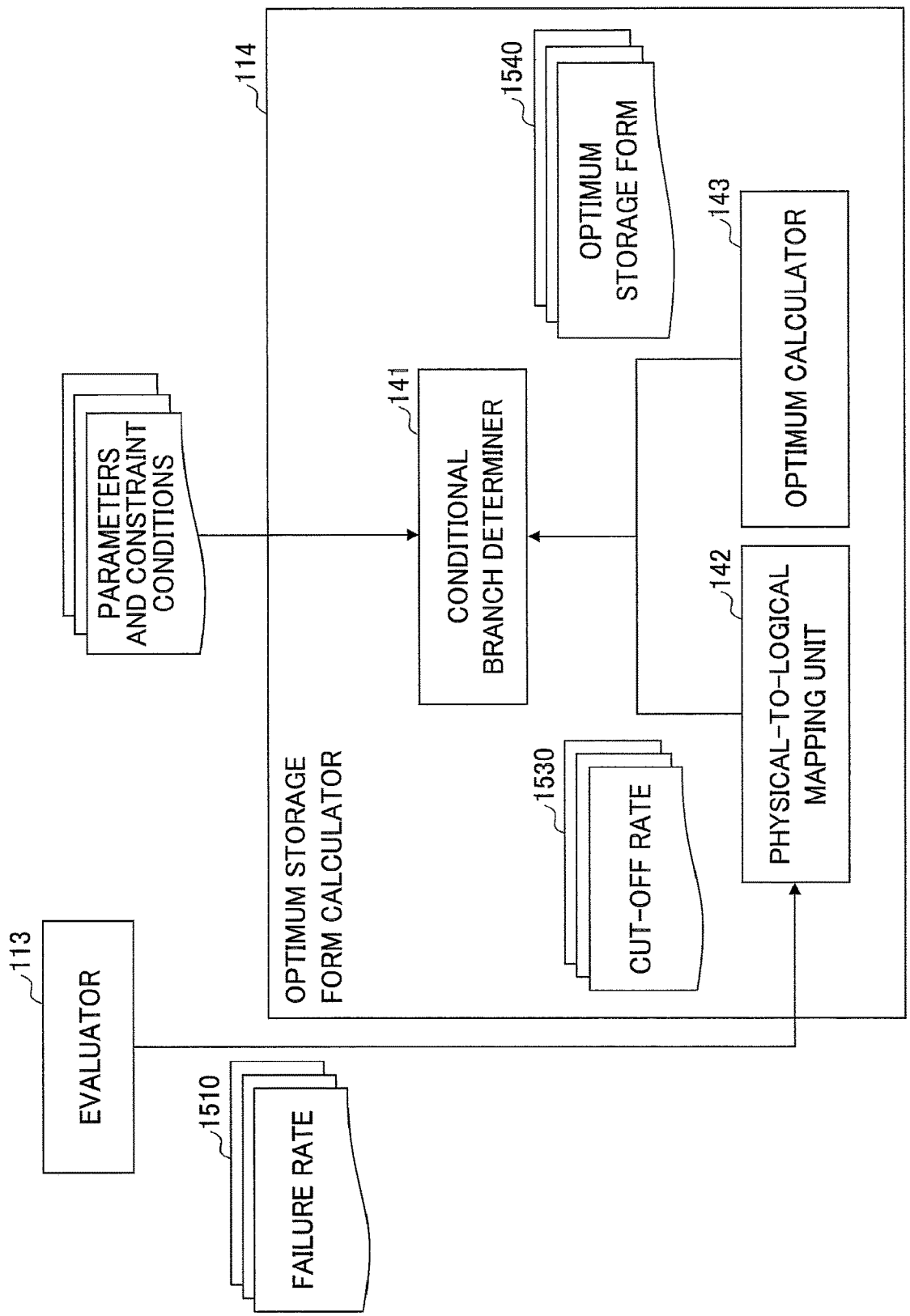
FIG. 6 is a diagram illustrating an example of a functional configuration of an optimum storage form calculator 114 according to the first embodiment.

FIG. 6 is a diagram illustrating an example of a functional configuration of the optimum storage form calculator 114 according to the first embodiment. In FIG. 6, the optimum storage form calculator 114 includes a conditional branch determiner 141, a physical-to-logical mapping unit 142, and an optimum calculator 143.

The conditional branch determiner 141 determines whether to execute rearrangement for a set of stored networks stored (arranged) on the logical network. If having determined that rearrangement is necessary, the conditional branch determiner 141 causes the optimum calculator 143 to calculate an optimum storage form 1540.

The physical-to-logical mapping unit 142 calculates a cut-off rate 1530 of each stored network on the logical network, based on the failure rates 1510 output from the evaluator 113. The cut-off rate of a stored network is a probability of the stored network transitioning into a state in which a connection path between any two nodes of the stored network is lost due to an occurrence of a failure of a certain physical link (or physical links) of the physical network.

The optimum calculator 143 solves a 0-1 integer programming problem, a mixed integer programming problem, or the like, and based on the obtained solution, calculates the optimum storage form 1540 of the stored network.

Inputs into the optimum storage form calculator 114 include the failure rate 1510 of each physical link output by the evaluator 113; the information obtained from the network information storage 117 (information on the topologies of the target physical network and logical network; the available bandwidth and latency of each link of the logical network; the CPU, the memory and storage capacities of each server node; the topology (storage form) of each stored network, the CPU, the capacity of the disk, and the like of the server 10 storing the stored network controller of each of the active system and the standby system); constraint conditions (i) and (ii) input by an operator 170, which will be described later; and the following parameters:

$th_1$: a threshold used for determining whether to execute rearrangement and for determining a set of stored networks to be rearranged during a suboptimization;

$\varepsilon_i (l=1, 2)$: a threshold used for comparing a candidate of the optimal solution with the current storage form; and $c_i$ (i=1, 2): a positive constant used for giving weights to an objective function.

Also, the output from the optimum storage form calculator 114 is a determination on whether to execute rearrangement of the stored networks. If rearrangement is necessary, a storage form after the rearrangement (optimum storage form 1540) is also output.

Note that in the present embodiment, a server 10 to be stored in a standby stored network controller is allowed to have a certain constraint with respect to the CPU, disk capacity, and the like. In the following, this will be referred to as the "constraint condition (i)".

Figure 7:
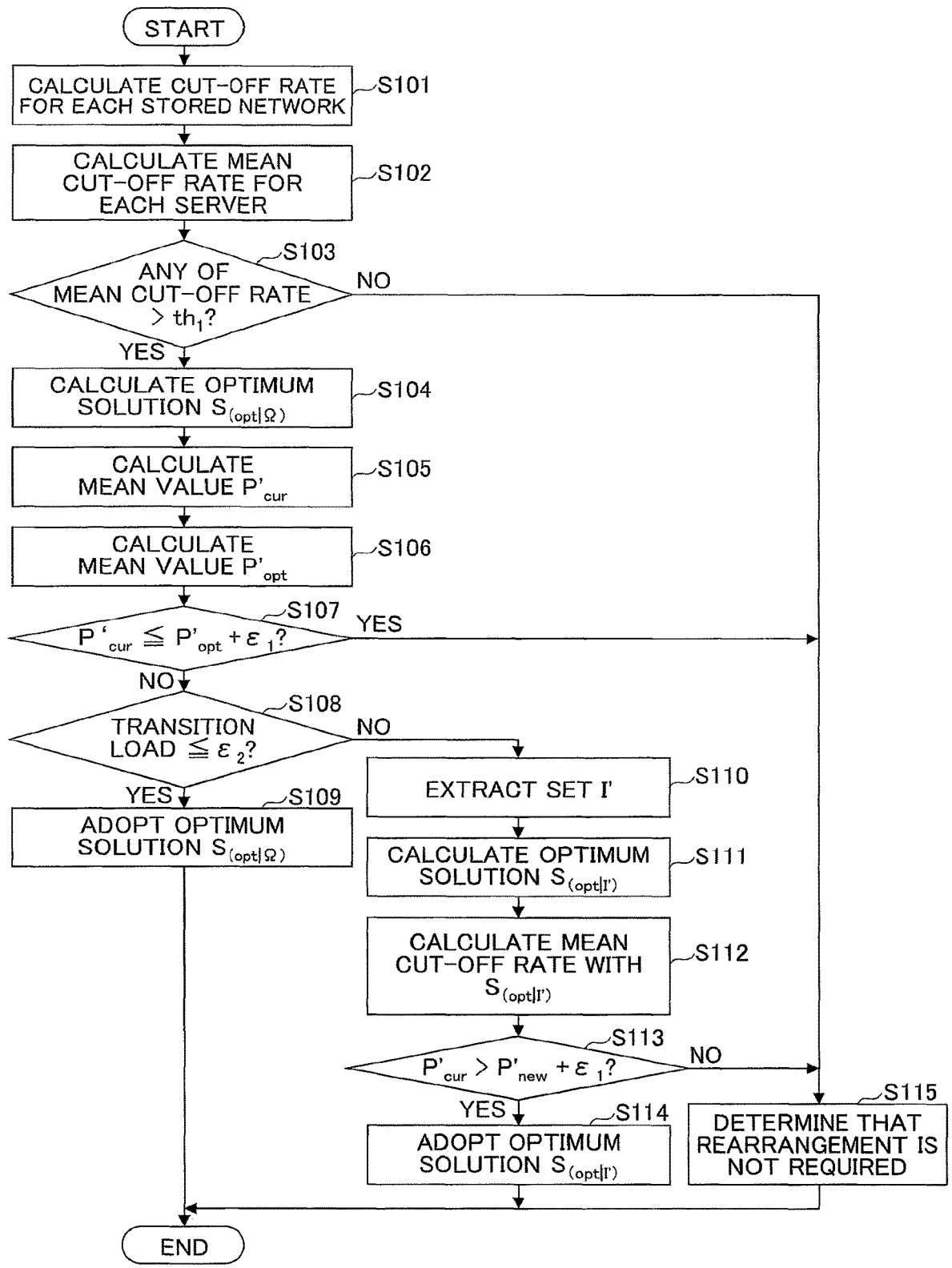
FIG. 7 is a flowchart for describing an example of processing steps executed by the optimum storage form calculator 114 according to the first embodiment.

FIG. 7 is a flowchart for describing an example of processing steps executed by the optimum storage form calculator 114 according to the first embodiment.

At Step S101, the physical-to-logical mapping unit 142 calculates the cut-off rate of each stored network based on the failure rate 1510 of each physical link. For example, denoting a set of the failure rates 1510 of the respective physical links by $\{p_j\}$, the optimum storage form calculator 114 calculates the cut-off rate of each of multiple stored networks from a node $i_1$ to $i_j$ via $i_2$ on the logical network, to calculate a set of cut-off rates $\{q (i_1, i_2 \ldots, i_j)\}$ 1530. Since there are multiple paths on the physical network that implement each stored network, all combinations of presence or absence of a failure of each physical link are enumerated, and among the combinations, based on patterns with which the target stored network is disconnected, the cut-off rate of the stored network is calculated. Details of the method of calculating the cut-off rate will be described later.

Next, the conditional branch determiner 141 calculates a mean value (mean cut-off rate) of the cut-off rates of the stored networks connected to the active or standby stored network controller, for each of the servers 10 that constitutes a terminal end of any one of the stored networks (S102). In other words, the mean value of the cut-off rates is calculated for each set of stored networks having a common terminal end.

If all the calculated mean cut-off rates are less than or equal to the threshold $th_1$ (NO at S103), the conditional branch determiner 141 determines that rearrangement is not necessary (S115), and ends the process. Therefore, in this case, rearrangement of the stored networks is not executed.

On the other hand, if any one of the calculated mean cut-off rates exceeds the threshold $th_1$ (YES at S103), the conditional branch determiner 141 activates the optimum calculator 143 taking as input a set Q of stored networks connected to the active stored network controller or the standby stored network controller (i.e., all the stored networks), to receive an optimal solution $S_{(opt|\Omega)}$ as output from the optimum calculator 143 (S104). Here, the optimal solution $S_{(opt|\Omega)}$ is a storage form of the stored networks that minimizes the mean value of the cut-off rates of all the stored networks. Note that formulation of the optimization problem will be described later. When calculating the optimum solution $S_{(opt|\Omega)}$, each stored network may be assumed to be connectable to any server node, or may have a certain constraint imposed with respect to candidates of server nodes to be connected. This type of constraint is referred to as the constraint condition (ii).

Next, the conditional branch determiner 141 calculates a mean value $P'_{cur}$ of the cut-off rates of all the stored networks connected to the active stored network controller at the present time (S105). Here, "at the present moment" means a state before optimization.

Next, the conditional branch determiner 141 calculates a mean value $P'_{opt}$ of the cut-off rates of the stored networks connected to the active stored network controller or the standby stored network controller, which is implemented by the optimal solution $S_{(opt|\Omega)}$ output by the optimum calculator 143 (S106).

If $P'_{cur} \leq P'_{opt} + \varepsilon_1$ holds (YES at S107), the conditional branch determiner 141 determines that any further effect cannot be expected even if control is executed with respect to the entire set $\Omega$ (i.e., rearrangement is no longer necessary) (S115), and ends the process.

On the other hand, if $P'_{cur} \leq P'_{opt} + \varepsilon_1$ does not hold (NO at S107), the conditional branch determiner 141 compares a (storage form)$_{cur}$ of the stored networks at the present time with a (storage form)$_{opt}$ of the stored networks calculated as the optimum solution $S_{(opt|\Omega)}$, to determine whether the load of transition from the (storage form)$_{cur}$ to the (storage form)$_{opt}$ (referred to as the "transition load", below) is less than or equal to $\varepsilon_2$ (S108). The transition load may be evaluated, for example, by a minimum value of the number of paths of the stored networks that need to be changed (moved) in order to transition from the (storage form)$_{cur}$ to the (storage form)$_{opt}$.

If the transition load is less than or equal to $\varepsilon_2$ (YES at S108), the conditional branch determiner 141 determines to adopt the optimal solution $S_{(opt|\Omega)}$ as the optimum storage form 1540 so as to rearrange the controlled network (S109). Therefore, in this case, the controller 111 executes the transition to the optimum solution $S_{(opt|\Omega)}$. Note that here, switching from the active system to the standby system of the stored network controller may be determined.

Figure 8:
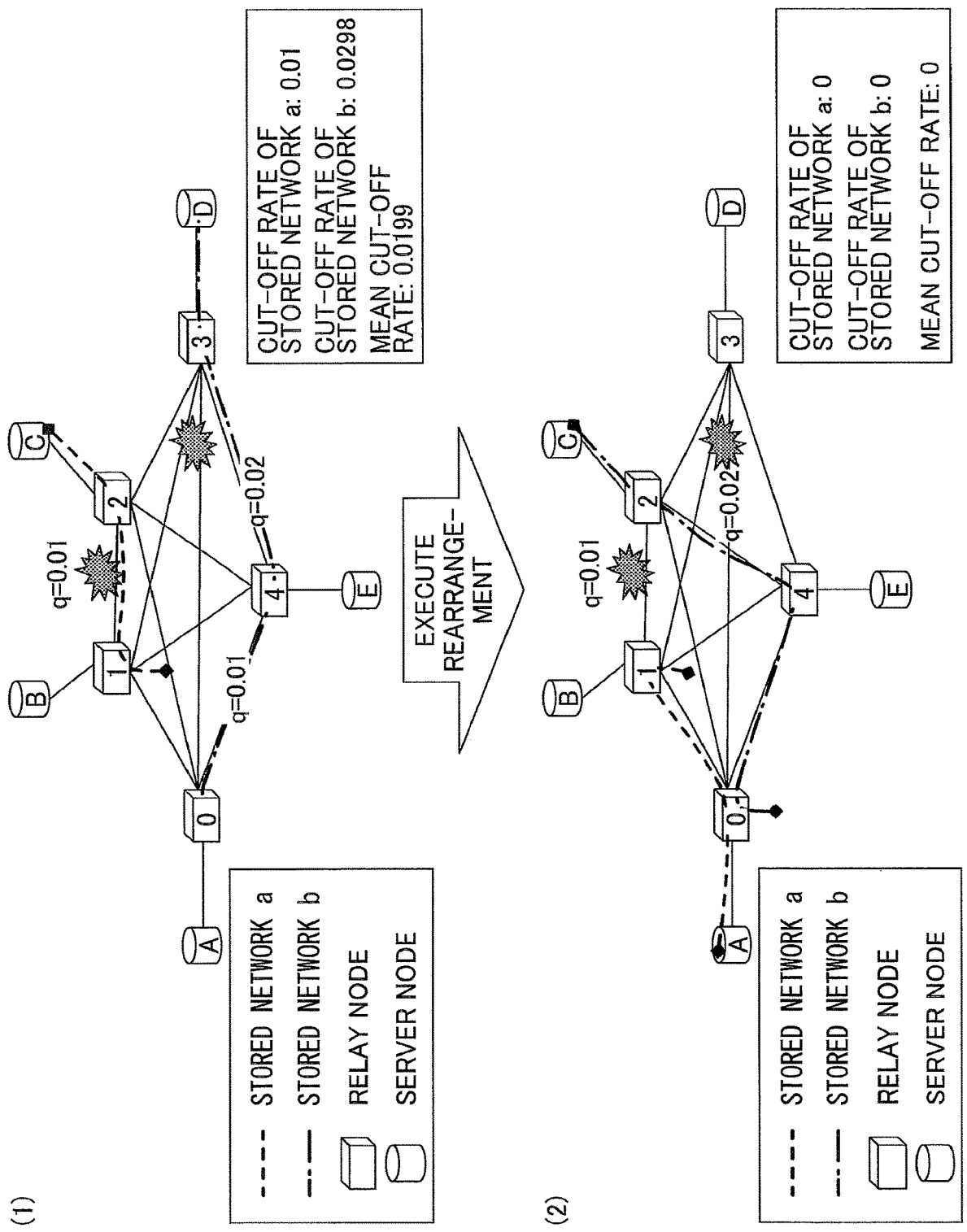
FIG. 8 is a diagram for describing rearrangement of a stored network.

FIG. 8 is a diagram for describing rearrangement of a stored network. In FIG. 8, (1) illustrates a state before executing rearrangement and (2) illustrates a state after having executed the rearrangement (optimum solution $S_{(opt|\Omega)}$).

In (1), a logical network stores two stored networks a and b whose cut-off rates q are 0.01 and 0.00298, respectively. Also, the mean value (mean cut-off rate) of these is 0.0199. This 0.0199 corresponds to $P'_{cur}$. Therefore, if 0.199 exceeds $P'_{opt} + \varepsilon_1$, the rearrangement to (2) is executed.

In (2), the cut-off rates q of the stored networks a and b are both 0, and the mean cut-off rate is also 0.

Note that in FIG. 8, the terminal ends of the stored networks a and b are different from each other. Therefore, in this case, at Step S104, the mean cut-off rate calculated for each server 10 being the terminal in the state of (1) is 0.01 and 0.0298.

On the other hand, if the transition load exceeds $\varepsilon_2$ (NO at S108), the optimization problem is solved again so as to have the transition load become less than or equal to $\varepsilon_2$, and a solution (suboptimum solution) next to the global optimum solution is obtained. When calculating the suboptimum solution, each stored network may be assumed to be connectable to any server node, or may have a certain constraint imposed with respect to candidates of server nodes to be connected. In other words, a constraint condition (ii) may be imposed.

Specifically, the conditional branch determiner 141 calculates the mean value of the cut-off rates of the stored networks connected to the active stored network controller or the standby stored network controller for each of the servers 10 that constitutes a terminal end of any one of the stored networks, to extract a set I' of the stored networks exceeding the mean value by $th_1$ or greater (S110).

Next, the conditional branch determiner 141 causes the optimum calculator 143 to solve the optimization problem in a restricted form in which rearrangeable stored networks are restricted to I', to obtain a solution $S_{(opt|I')}$ (S111). However, if $|I'|>\varepsilon_2$, among the stored networks included in I', a set of stored networks having top $\varepsilon_2$ cut-off rates are regarded as rearrangeable stored networks to solve the optimization problem. Note that $|I'|$ represents the number of elements of I'.

Next, the conditional branch determiner 141 calculates a mean value $P'_{new}$ of the cut-off rates of all the stored networks in the storage form implemented by $S_{(opt|I')}$ (S112).

If $P'_{cur}>P'_{new}+\varepsilon_1$ holds (YES at S113), the conditional branch determiner 141 determines to adopt a storage form of the stored networks according to the solution $S_{(opt|I')}$ as the optimum storage form 1540, to execute rearrangement (S114).

On the other hand, if $P'_{cur}>P'_{new}+\varepsilon_1$ does not hold (NO at S113), the conditional branch determiner 141 determines that rearrangement is not necessary, and ends the process (S115).

Next, Step S101 will be described in detail.

When calculating the cut-off rate of each stored network, the physical-to-logical mapping unit 142 first enumerates all combinations (failure occurrence patterns) of states of connection or disconnection (presence or absence of failure) of the respective physical links. Next, from among the enumerated failure occurrence patterns, the physical-to-logical mapping unit 142 extracts failure occurrence patterns with which a target stored network falls in a disconnected state. Since it can be considered that failures of the physical links occur independently, these failure occurrence-patterns can be regarded as events occurring independently from each other. Therefore, by obtaining the total sum of the probabilities of occurrences of the extracted failure occurrence patterns, the cut-off rate of the stored network can be obtained.

For example, in FIG. 1, consider the physical network illustrated in (1) and the logical network illustrated in (2). Here, consider the cut-off rate of a stored network "0-4-E" on the logical network.

FIG. 9 is a diagram illustrating an example of enumeration of failure occurrence patterns of the physical links on the physical network. In FIG. 9, each row corresponds to a failure occurrence pattern of the physical links. Also, the rightmost column of the table represents whether the stored network "0-4-E" is in a conductive state or falls in a disconnected state with the failure occurrence pattern for each row (a circle represents a conductive state, and an x represents a disconnected state). Therefore, the set of numbered failure occurrence patterns with which the stored network falls in a disconnected state is Y={4, 6, 7, 8, 10, 12, 14, 16, 18, 20, 22, 24, 26, 28, 30, 32}, which consists of 16 patterns.

Here, denoting the failure rate of a physical link between nodes x and y by $p_{xy}$, for example, the occurrence probability $P_4$ of the numbered pattern 4 is expressed as $P_4=(1-p_{01})(1-p_{12})(1-p_{23})p_{34}p_{40}$. Similarly, the physical-to-logical mapping unit 142 also calculates the probability of occurrence of the other failure occurrence patterns in Y. Meanwhile, since a subring is formed between nodes 4 and E, both nodes lose conductivity only if both the clockwise and counterclockwise physical links are disconnected. Denoting the probability that both the clockwise and counterclockwise physical links are disconnected by $q_{4E}$, the probability q is calculated as follows.

$$q = \sum_{x \in Y} P_x + q_{4E} \sum_{x \notin Y} (1 - P_x)$$

The value of q is the cut-off rate of the stored network to be output from the physical-to-logical mapping unit 142.

Next, calculation of a solution by the optimum calculator 143 will be described.

The optimum calculator 143 executes optimum calculation with inputs of a set X of rearrangeable stored networks selected by the conditional branch determiner 141; the cut-off rates 1530 of the stored networks output from the physical-to-logical mapping unit 142; and inputs from an operator 170 including parameters and constraint conditions (i) and (ii).

A method of calculating a solution $S_{(opt|X)}$ in the optimization problem calculated by the optimum calculator 143 will be described. Note that X is a set of rearrangeable stored networks (as reallocation candidates), which corresponds to $\Omega$ or I' described above.

First, the optimum calculator 143 enumerates, for each stored network belonging to X, all paths on a logical network that satisfy the constraint condition (i) for the stored network. In the following, $h_i^{(l)}$ represents the number of hops in the i-th path of the l-th stored network. The l-th stored network means a stored network in X ordered with a number l. The i-th path is a path ordered with a number i among the paths enumerated for the l-th stored network. Also, $h^{(l)}$ represents a row vector whose i-th element is $h_i^{(l)}$. Also, $q^{(l)}$ represents a row vector whose i-th element is the cut-off rate of the i-th path of the l-th stored network. Further, $d^{(l)}$ represents the required bandwidth of the l-th stored network (here, a single path). Furthermore, $$a_{(i,j)}^{(l)} = \begin{cases} d^{(l)} \begin{pmatrix} \text{if } i\text{-}th \text{ logical link is included in } j\text{-}th \\ \text{path of } l\text{-}th \text{ control network} \end{pmatrix}; \\ 0 \text{ (else)}. \end{cases}$$

$$A^{(l)} = [a_{(i,j)}^{(l)}];$$

$$C_e = [C_i]^T;$$

where $c_i$ ($i \in E$) represents the bandwidth of each logical link;

$T_r^{(l)}$ represents a set of paths of the l-th stored network; and $$x^{(l)} = [x_k^{(l)}]^T;$$

$$x_k^{(l)} = \begin{cases} 1 (\text{if } k\text{-}th \text{ path is used in } l\text{-}th \text{ control network}); \\ 0 \text{ (else)}. \end{cases}$$

Also, the current arrangement of the l-th stored network is denoted as $x_{k0}^{(l)}$. However, as described above, in general, the rearrangement of the stored network allows a change from the active stored network controller to the standby stored network controller within the constraint conditions (i) and (ii), and accordingly, the above paths (paths) are enumerated.

Under these preparations, the optimum calculator 143 solves the following 0-1 linear programming problem.

$$\begin{cases} \min_{l \in X} c_1 \sum_{l \in X} q^{(l)} x^{(l)} + c_2 \left( \sum_{l \in X} h^{(l)} x^{(l)} + \sum_k |x_k^{(l)} - x_{k0}^{(l)}| \right); \\ \text{s.t.} \sum_{l \in X} A^{(l)} x^{(l)} \le c_e; \\ \sum_{k \in T_r^{(l)}} x_k^{(l)} = 1 \ \forall \ l. \end{cases}$$

However, in the case where there exist multiple solutions that take the same objective function value, one of them is to be adopted randomly. Once a solution of the optimization problem has been obtained in this way, since each component whose value of the variable $x_k^{(l)}$ is 1 represents a candidate path of each stored network, the optimum calculator 143 outputs components whose variable $x_k^{(l)}$ is 1 as a combination of optimum paths, and ends the process.

Note that here, as an example, the mean cut-off rate is adopted as the objective function; however, for example, the maximum cut-off rate may be adopted. In other words, a storage form that minimizes the maximum value of the cut-off rate may be searched for.

Next, as a specific example of the present embodiment, an example will be presented in which based on past actual rainfall data that has been made public by the Meteorological Agency, the above calculation is executed by applying the data to certain network facilities. A physical network and a logical network are assumed as illustrated in FIG. 1. The rainfall data to be used is rainfall data of heavy rain observed in August 2014 in a region called Iwakuni.

First, the disaster area estimator 112 calculates a cumulative rainfall index in each area partitioned by a 5-km mesh, to estimate hazard areas (S3 in FIG. 5). Also, the evaluator 113 calculates the failure rate of each physical link based on the estimation result of the hazard areas and the like (S4 in FIG. 5).

FIG. 10 is a diagram illustrating a transition in time of the rainfall and a transition in time of the failure rates of the physical links in the specific example. In FIG. 10, the upper half illustrates a transition in time of the mean value of the rainfall per unit time in all the meshes. In the lower half, values of the failure rates 1510 output for ten of the physical links are illustrated in chronological order.

It can be confirmed from FIG. 10 that the transition of the failure rates 1510 of the physical links has a tendency similar to the transition of the rainfall in the upper half.

Figure 11:
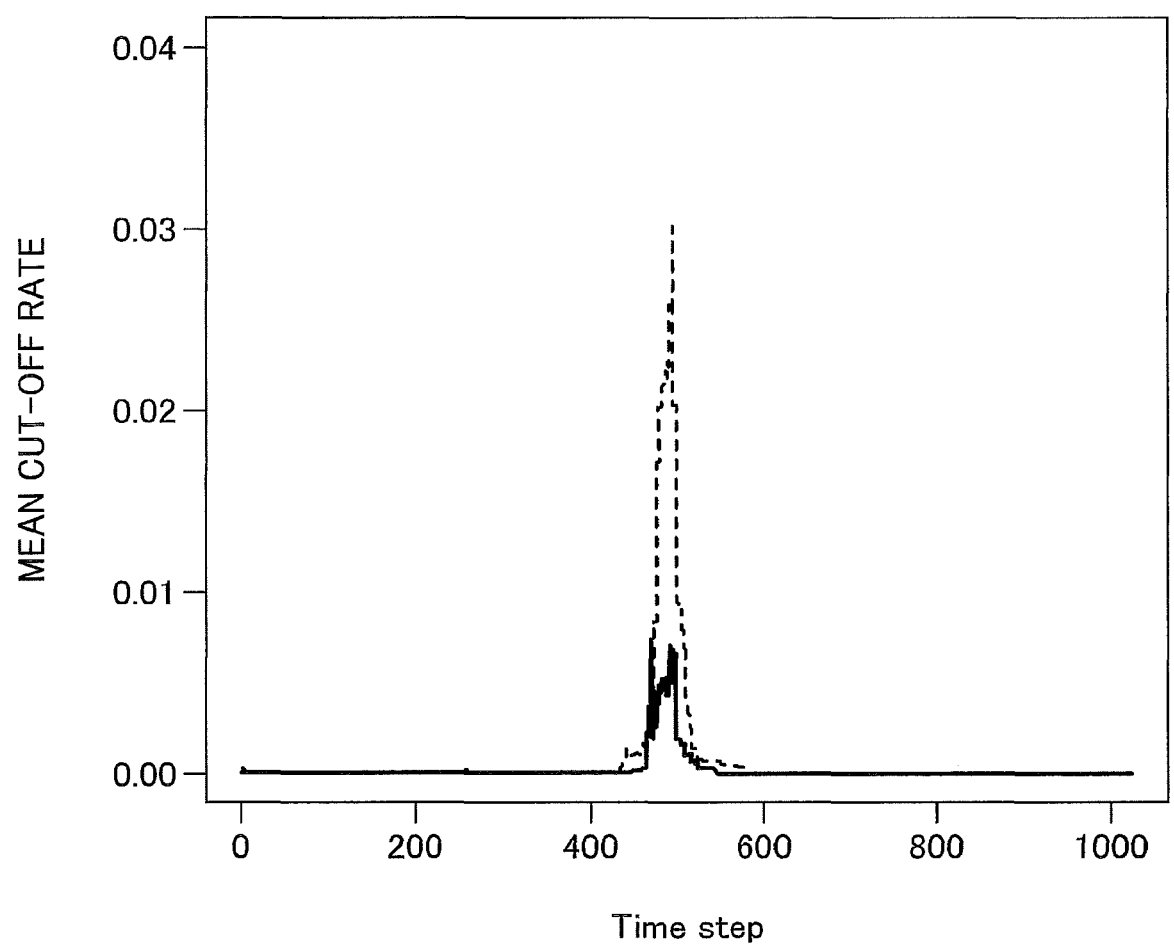
FIG. 11 is a diagram comparing changes of the mean cut-off rate of a stored network between in the case of applying and in the case of not applying the present embodiment.

FIG. 11 is a diagram comparing transitions of the mean cut-off rate of the stored network between the case of applying and the case of not applying the present embodiment. In other words, in FIG. 11, using the failure rates 1510 illustrated in the lower half in FIG. 10, a mean cut-off rate calculated by applying the present embodiment to stored networks (here, a single path) is designated by a solid line, and a mean cut-off rate calculated without applying the present embodiment is designated by a broken line. Note that the case of not applying the present embodiment refers to a case where rearrangement of the stored network is not executed.

According to FIG. 11, during a period of time in which the rainfall increases and the failure rates 1510 of the physical links increase, if the rearrangement is executed, the mean cut-off rate of the stored network decreases, with which it can be confirmed that the effect brought by the application of the present embodiment is remarkable. Note that in this case, it is assumed that the initial arrangement has each stored network evenly connected to the server nodes, and as a constraint condition (i), any stored network evenly has a terminal end among the relay nodes. Other specifications are illustrated in Table 1 and Table 2.

TABLE 1

Experiment specifications (1)

| Parameter | $th_1$ | $\varepsilon_1$ | $\varepsilon_2$ | $c_1$ | $c_2$ |
|---|---|---|---|---|---|
| Value | 0.0001 | 0.01 | 5 | 0.99999 | 0.00001 |

TABLE 2

Experiment specifications (2)

| Parameter | Number of stored networks (paths) | Required bandwidth | Available bandwidth of logical links |
|---|---|---|---|
| Value | 25 | 10 | 100 |

Note that in Table 2, the required bandwidth is common for the stored networks. Also, the available bandwidth is also common for the logical links.

As described above, according to the first embodiment, a path of a stored network relating to an estimated area where an occurrence of a disaster can be forecasted or is foreseeable is rearranged so as to make the influence by the disaster smaller. Here, stored networks to be rearranged include not only a virtual network but also a control network for controlling the virtual network. In other words, the geographical configuration of the virtual network and the control system of the virtual network can be optimized with respect to disaster tolerance. Therefore, according to the present embodiment, it is possible to improve controllability for disasters with respect to stored networks. For example, a communication carrier can put a service being provided in a controllable state even in the event of an imminent disaster.

Next, a second embodiment will be described. In the second embodiment, points different from the first embodiment will be described. The points not particularly mentioned in the second embodiment may be the same as in the first embodiment.

In the second embodiment, an optimum storage form is calculated based on information on the bandwidth of a physical network and information on logical connectivity on the physical network between nodes in a logical network. Also, in the second embodiment, an optimum storage form calculator 114 takes an upper limit value on the transition time of a stored network into account as one of the constraint conditions in the optimization problem, to calculate an optimum storage form. As the constraint conditions, a network information storage 117 stores, in addition to information stored as in the first embodiment, the file size of a virtual machine (VM) that provides a virtual service on a server node of an individual stored network, and constants used as models of deletion and generation time of the VM. The constraint conditions (i) and (ii) in the first embodiment are also effective in the second embodiment. The meanings of parameters including $th_1$, $\varepsilon_i$ (i=1, 2), $c_i$ (i=1, 2), and the like are substantially the same as in the first embodiment. However, values of these parameters may be different from those in the first embodiment.

In the second embodiment, the processing content at Step S5 in FIG. 5 is different from that in the first embodiment. In the second embodiment, inputs into the optimum storage form calculator 114 include, in addition to the inputs as in the first embodiment, the file size of a VM (of a server node) accompanying an individual stored network, and the constants used as models of deletion and generation time of the VM obtained from the network information storage 117.

Figure 12:
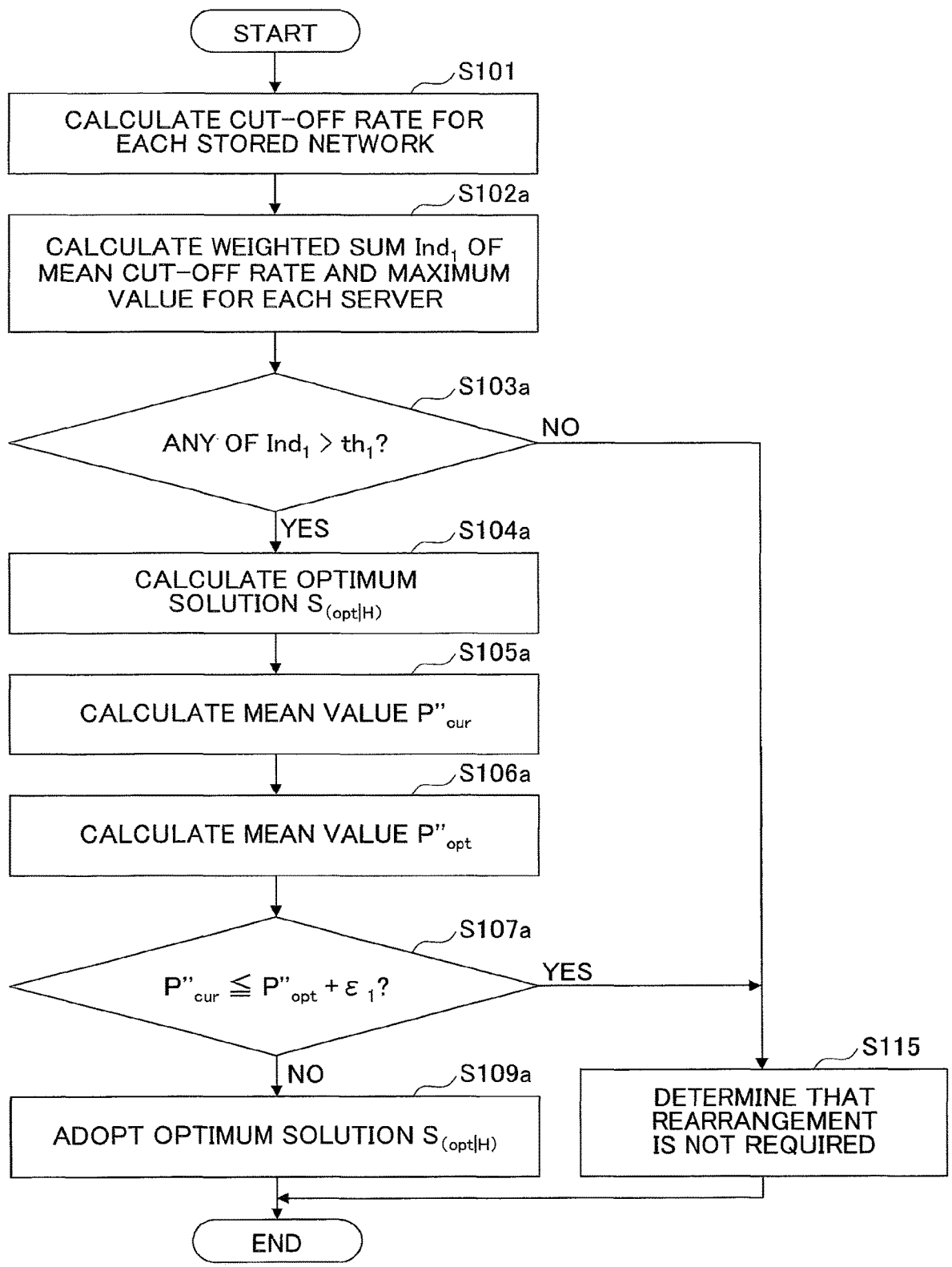
FIG. 12 is a flowchart for describing an example of processing steps executed by an optimum storage form calculator 114 according to a second embodiment.

FIG. 12 is a flowchart for describing an example of processing steps executed by the optimum storage form calculator 114 according to the second embodiment. In FIG. 12, the same step numbers are attached to the same steps as those in FIG. 7, and the description is omitted.

At Step S102a, the conditional branch determiner 141 calculates a weighted sum (this index is denoted as "$\text{Ind}_1$", below) of a mean value (mean cut-off rate) and a maximum value of the cut-off rates of the stored networks connected to the active or standby stored network controller, for each of the servers 10 that constitutes a terminal end of any one of the stored networks. In other words, for each set of stored networks having a common terminal end, the value of the index $\text{Ind}_1$ defined as follows is calculated.

$$\text{Ind}_1 = c1\ \max_{s \in T_v} q[s] + c2 \Sigma s \in T_v q[s] / \#T_v \qquad (1)$$

where the symbol s represents a stored network; q[s] represents the cut-off rate of the stored network s; and $\#T_v$ represents the number of elements of the set $\#T_v$. Also in Equation (1), the summation operation in a term on the right side is executed over a set $T_v$ of stored networks terminated with a server node v, and executed for each of the server nodes v. As described above, c1 and c2 are positive constants used for giving weights to the objective function, and are held in advance by the optimum calculator 143.

If all the calculated $\text{Ind}_1$ values are less than or equal to the threshold $\text{th}_1$ (NO at S103a), the conditional branch determiner 141 determines that rearrangement is not necessary (S115), and ends the process. Therefore, in this case, rearrangement of the stored networks is not executed.

On the other hand, if there is a server node whose index $\text{Ind}_1$ is greater than the threshold $\text{th}_1$, namely, if the value of index $\text{Ind}_1$ of any one of the server nodes exceeds the threshold $\text{th}_1$ (YES at S103a), the conditional branch determiner 141 sets a set of server nodes whose index $\text{Ind}_1$ exceeds the threshold $\text{th}_1$ as $\Theta\theta1$; sets a set of stored networks terminated at a server node belonging to $\Theta\theta1$ as H; and activates the optimum calculator 143 taking as input the set H, to receive an optimal solution $S_{(opt|H)}$ as output from the optimum calculator 143 (S104).

Here, the optimal solution $S_{(opt|H)}$ is a storage form of stored networks with which an index $\text{Ind}_2$, which is calculated as follows, becomes minimum among feasible solutions of an optimization problem or its approximation problem, which will be described later, with respect to stored networks belonging to the set H.

$$\text{Ind}_2 = c1\ \max_{s \in H} \Sigma_{r \in \mathfrak{R}}(s) q[r] x_r^{(s)} + c2 \Sigma_{(s,r) \in \Delta} q[r] x_r^{(s)} / \#H \qquad (2)$$

where in Equation (2), q[r] represents the cut-off rate of the physical network r; the set $\mathfrak{R}(s)$ is a set of paths on the physical network corresponding to paths on the logical network as candidates of stored networks; and a set $\Delta$ is defined as follows:

$$\Delta = \cup \{s\} \times \mathfrak{R}(s)$$

Further, $x_r^{(s)}$ is a binary unknown variable whose value is 1 if the stored network s uses the path r on the physical network, or 0 otherwise. Note that formulation of the optimization problem will be described later. When calculating an optimum solution $S_{(opt|\Omega)}$ each stored network may be assumed to be connectable to any server node, or may have a certain constraint imposed with respect to candidates of server nodes to be connected. This type of constraint is referred to as a constraint condition (ii) as in the first embodiment.

Next, the conditional branch determiner 141 calculates a value $P''_{cur}$ of the index $\text{Ind}_1$ with respect to all the stored networks connected to the active stored network controller at the present time (S105a). Here, "at the present moment" means a state before optimization.

Next, the conditional branch determiner 141 calculates a value $P''_{opt}$ of the index Inch with respect to stored networks connected to the active stored network controller or the standby stored network controller, which are to be implemented by the optimum solution $S_{(opt|H)}$ output from the optimum calculator 143 (S106a).

If $P''_{cur} \leq P''_{opt} + \varepsilon_1$ holds (YES at S107a), the conditional branch determiner 141 determines that any further effect cannot be expected even if control is executed with respect to the entire set $\Omega$ (i.e., rearrangement is no longer necessary) (S115), and ends the process.

On the other hand, if $P''_{cur} \leq P''_{opt} + \varepsilon_1$ does not hold (NO at S107a), the conditional branch determiner 141 determines to adopt the optimal solution $S_{(opt|H)}$ as the optimum storage form 1540 so as to rearrange the stored network (S109a). Therefore, in this case, the controller 111 executes the transition to the optimum solution $S_{(opt|H)}$. Note that here, switching from the active system to the standby system of the stored network controller may be determined.

Next, calculation of the solution $S_{(opt|H)}$ by the optimum calculator 143 will be described. The optimum calculator 143 executes optimum calculation with inputs of a set H of rearrangeable stored networks selected by the conditional branch determiner 141; the cut-off rates 1530 of the stored networks output from the physical-to-logical mapping unit 142; and inputs from an operator 170 including parameters and constraint conditions (i) and (ii).

First, the optimum calculator 143 enumerates, for each stored network belonging to H, all paths on the logical network that satisfy the constraint condition (i) for the stored network. In the following, a set of all server nodes will be denoted as $V_{(d)}$. Also, in the following, paths on the logical network enumerated before the optimization calculation mean, for each stored network, paths on the current logical network, or in the case of executing rearrangement, paths on the logical network coupled with a server node on which the VM is installed after the relocation.

Figure 13:
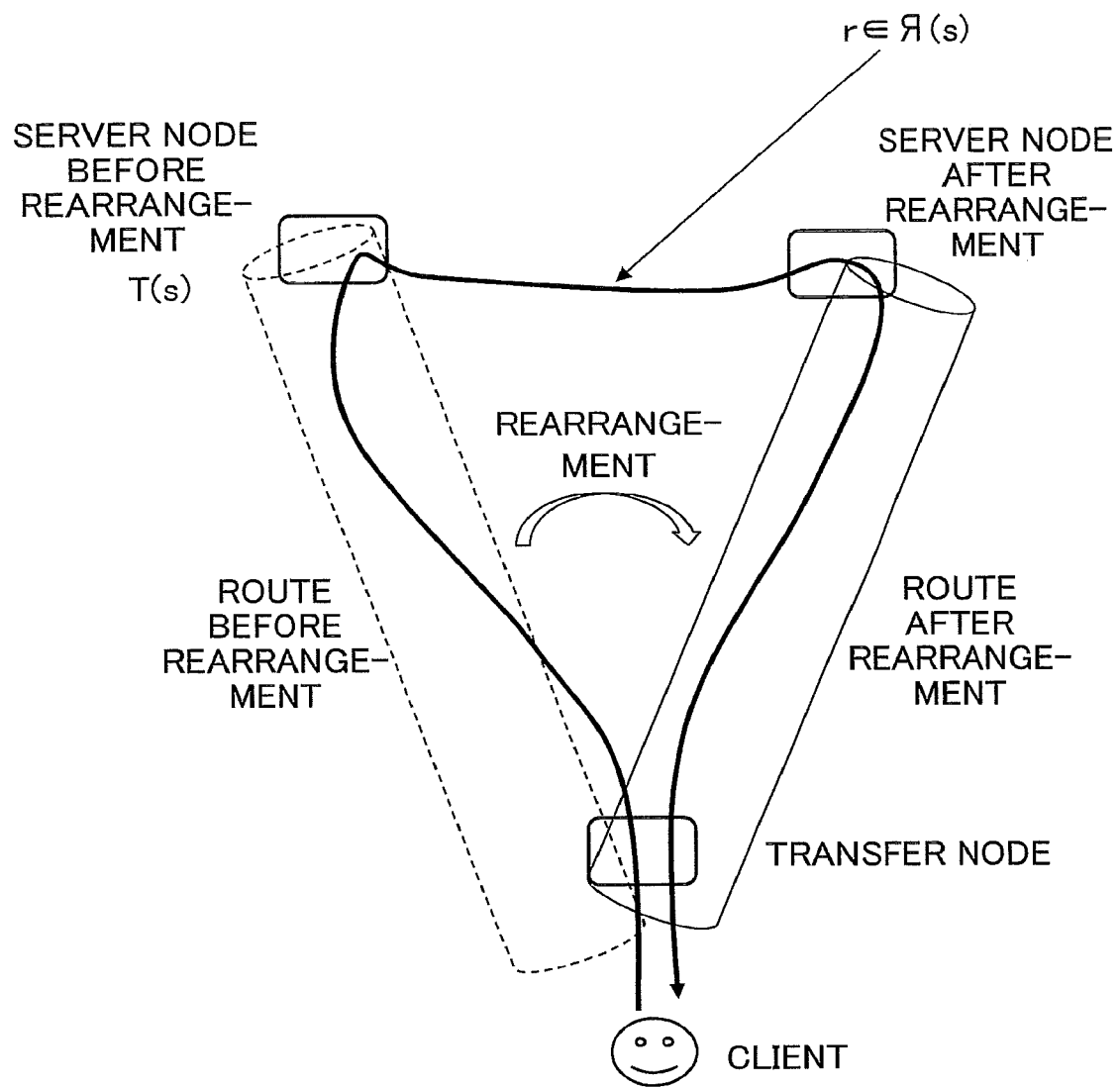
FIG. 13 is a diagram illustrating an image of paths on a physical network to be enumerated.

One of the unknown variables in the optimum calculator 143 is the binary variable $x_r(s)$ described above. FIG. 13 illustrates an image of paths on a physical network to be enumerated. FIG. 13 illustrates an image of a rearrangement accompanying a VM relocation, and a coefficient tensor corresponding to this is defined as follows:

$$u_{r,\tau[s],v}^{(s)} = \begin{cases} 1 & (\textit{VM}\text{-installed server node before rearrangement of path } r \text{ is } \tau[s], \\ & \text{and the server node after rearrangement is } v) \\ 0 & (\text{otherwise}); \end{cases}$$

$$u_{r,e}^{(s)} = \begin{cases} 1 & (\text{path for data transmission and reception after,} \\ & \text{rearrangement of path } r \text{ uses physical link } e) \\ 0 & (\text{otherwise}); \end{cases}$$

$$\tilde{u}_{r,e}^{(s)} = \begin{cases} 1 & (\text{path for relocating } \textit{VM} \text{ after rearrangement} \\ & \text{of path } r \text{ uses physical link } e) \\ 0 & (\text{otherwise}); \end{cases}$$

The optimum calculator 143 enumerates these paths r in the optimum calculation to solve the optimization problem. In an actual calculation, from the viewpoint of performance, the upper limit k of the number of paths may be defined so as to select, for example, k shortest paths from among the paths on the physical network.

Under the above definitions, the upper limit of the bandwidth of the physical network, and constraint conditions on the CPU, memory and storage capacities of the available servers stored in the network information storage 117 can be written as follows.

$$\sum_{(s,r)\in\Delta}(b_s^{(0)}u_{r,e}^{(s)}+\tilde{b}_s^{(0)}\tilde{u}_{r,e}^{(s)})x_r^{(s)} \leq \check{b}_e^{(0)}-\bar{b}_e^{(0)} \quad e\in E, (j=1,2,3),$$

$$\sum_{(s,r)\in\Delta}b_s^{(j)}u_{v,r}^{(s)}x_r^{(s)} \leq b_v^{(j)}-\bar{b}_v^{(j)} \quad v\in V_{(d)}(j=1,2,3).$$

where E represents a set of physical links, and the other symbols are defined as follows:

$b_s^{(0)}$: required bandwidth of a stored network s
$\tilde{b}_s^{(0)}$: bandwidth used on path on which a server connected with the stored network s is relocated
$\check{b}_e^{(0)}$: available bandwidth of a physical link e
$\bar{b}_e^{(0)}$: residual bandwidth of the physical link e
$b_s^{(1)}$: CPU consumption on a server node consumed by the stored network s
$b_s^{(2)}$: memory consumption on a server node consumed by the stored network s
$b_s^{(3)}$: storage consumption on a server node consumed by the stored network s
$b_v^{(1)}$: CPU capacity provided on server node v
$b_v^{(2)}$: memory capacity provided on server node v
$b_v^{(3)}$: storage capacity provided on server node v
$\bar{b}_v^{(1)}$: CPU capacity consumed on server node v at the moment
$\bar{b}_v^{(2)}$: memory capacity consumed on server node v at the moment
$\bar{b}_v^{(3)}$: storage capacity consumed on server node v at the moment Next, the time required for VM relocation is considered as one of the constraint conditions. The time required for VM relocation needs to be satisfied for each stored network and can be written as follows:

$$F_s/\tilde{b}_s^{(0)}+\Sigma_r\Sigma_e d_e u_{r,e}^{(s)} x_r^{(s)} + \eta_s \leq \epsilon_3 \quad (3)$$

where $F_s$ represents the file size of the VM of a stored network s; $d_e$ represents the latency of a physical link e; $\eta_s$ represents a required time to relocate the VM of the stored network s excluding the transfer time, namely, a total of processing time on the server node; and $\epsilon_3$ is an upper limit of the allowable time for relocating the VM (upper limit value of transition time of the VM). However, here, these are based on the premise that VM transition processes of respective stored networks are started at the same time and processed in parallel.

Here, $\eta_s$ is further modeled by dividing it into the deletion time of the VM on a server node as the relocation source and the generation time on a server node as the relocation destination. For example, the VM deletion time is considered as a constant to be denoted as $C_3$. Next, the VM generation time is modeled as follows, denoting a server node as the relocation destination of the VM of the stored network s by $m_s$, and denoting the VM generation time on the server by $f_{(r)ms}$.

$$f_{(r)ms}=d_1 N_1(m_s)+d_2 N_2+C_3$$

where $N_1$ (ms) represents the number of VMs generated on the server node $m_s$; and $N_2$ represents the total number of stored networks accompanying the VM relocation. By using the above, Equation (3) can be finally written as follows.

$$F_s/\tilde{b}_s^{(0)}+\Sigma_r\Sigma_e d_e \tilde{u}_{r,e}^{(s)} x_r^{(s)}$$

$$+d_1\Sigma_{s',v,r,r'}\{1-a(v',s)\}u_{r,(\tau[s],v)}^{(s)}u_{r',(\tau[s'],v)}^{(s')}x_r^{(s)}x_{r'}^{(s')}$$

$$+d_2\Sigma_s\{1-\Sigma_v a(v,s)\}(u_{r,(\tau[s],v)}^{(s)}x_r^{(s)})\} \leq \epsilon_3$$

where
$a(v,s)=\Sigma_r\Sigma_e d_e u_{r,(\tau,[s],v)}^{(s)} \ddot{x}_r^{(s)}$,
and $\ddot{x}_r^{(s)}$ corresponds to storing state before rearrangement From the above, the optimization problem solved by the optimum calculator 143 in this case is described as follows.

Minimize $c1z+c2\Sigma_{(s,r)\in\Omega}q[r]x_r^{(s)}/\#\mathbb{B}$;

Subject to: $z \geq \tau_M[x]$ $x_r^{(s)} \leq y_r$;

$\Sigma_r x_r^{(s)}=1$;

$z\in R+, x_r^{(s)}, y_r \in\{0,1\}(s,r)\in\Omega$;

$\Sigma_{(s,r)\in\Omega}b_s^{(0)}u_{r,e}^{(s)}x_r^{(s)} \leq \check{b}_e^{(0)}-\bar{b}_e^{(0)} e\in E$, $\Sigma_{(s,r)\in\Omega}b_s^{(j)}u_{v,r}^{(s)}x_r^{(s)} \leq b_v^{(j)}-\bar{b}_v^{(j)} v\in V_{(d)}(j=1,2,3)$;

$F_s/\tilde{b}_s^{(0)}+\Sigma_r\Sigma_e d_e \tilde{u}_{r,e}^{(s)} x_r^{(s)}$ $+d_1\Sigma_{s',v,r,r'}\{1-a(v',s)\}u_{r,(\tau[s],v)}^{(s)}u_{r',(\tau[s'],v)}^{(s')}x_r^{(s)}x_{r'}^{(s')}$ $+d_2\Sigma_s\{1-\Sigma_v a(v,s)\}(u_{r,(\tau[s],v)}^{(s)}x_r^{(s)})\}+(C_3+Cs) \leq \epsilon_3$ However, in the case where there exist multiple solutions that take the same objective function value, one of them is to be adopted randomly. Once a solution of the optimization problem has been obtained in this way, since each component whose value of the variable $x_r^{(s)}$ is 1 represents a candidate path of each stored network, the optimum calculator 143 outputs components whose variable $x_r^{(s)}$ is 1 as a combination of optimum paths, and ends the process.

Next, a third embodiment will be described. In the third embodiment, points different from the second embodiment will be described. The points not particularly mentioned in the third embodiment may be the same as in the second embodiment.

In the third embodiment, the objective function in the optimization problem solved by an optimum calculator 143 is different from that in the second embodiment. In other words, in the third embodiment, the objective function is to minimize the mean value of cut-off rates of stored networks whose cut-off rates are within top $\alpha$ % (a predetermined upper rate) (a specific subset of the stored networks). Here, $\alpha$ is a real number being $0<\alpha<100$. In other words, the following problem is considered assuming $K=\alpha$ #H.

Minimize $\beta+\Sigma_{(s,r)\in\Omega}w[s,k]/K$;

Subject to: $\beta \leq w[s,k]+\Sigma_{r\in\Re(s)}q[r]x_r^{(s)}$ $x_r^{(s)} \leq y_r$;

$\Sigma_r x_r^{(s)}=1$;

$z\in R+, x_r^{(s)}, y_r \in\{0,1\}(s,r)\in\Omega$;

$w[s,k] \geq 0 k=1,2,\ldots,K$;

$\Sigma_{(s,r)\in\Omega}b_s^{(0)}u_{r,e}^{(s)}x_r^{(s)} \leq \check{b}_e^{(0)}-\bar{b}_e^{(0)} e\in E$, $$\Sigma_{(s,r)\in\Omega}b_s^{(j)}u_{v,r}^{(s)}x_r^{(s)}\le b_v^{(j)}-\bar{b}_v^{(j)}v\in V_{(d)},(j=1,2,3);$$

$$F_s/\bar{b}_s^{(0)}+\Sigma_e\Sigma_e d_e\tilde{a}_{r,e}^{(s)}x_r^{(s)}$$

$$+d_1\Sigma_{s',v,r,r'}\{1-a(v',s)\}u_{r,(\tau[s],v)}^{(s)}u_{r',(\tau[s'],v)}^{(s')}x_r^{(s)}x_r^{(s')}$$

$$+d_2\Sigma_s\{1-\Sigma_v a(v,s)\}(u_{r,(\tau[s],v)}^{(s)}x_r^{(s)})\}+(C_3+Cs)\le\varepsilon_3$$

However, in the case where there exist multiple solutions that take the same objective function value, one of them is to be adopted randomly. Once a solution of the optimization problem has been obtained in this way, since each component whose value of the variable $x_r^{(s)}$ is 1 represents a candidate path of each stored network, the optimum calculator 143 outputs components whose variable $x_r^{(s)}$ is 1 as a combination of optimum paths, and ends the process.

Note that in each of the above embodiments, the operation center 110 is an example of a storage form searching device. The physical-to-logical mapping unit 142 is an example of a calculator. The optimum calculator 143 is an example of a searcher.

As above, the embodiments of the present invention have been described in detail. Note that the present invention is not limited to such specific embodiments, and various variations and modifications may be made within the scope of the subject matters of the present invention described in the claims.

The present patent application claims priority based on Japanese Patent Application No. 2016-206950 filed on Oct. 21, 2016, and Japanese Patent Application No. 2017-084161 filed on Apr. 21, 2017, and the entire contents of the Japanese Patent Applications are incorporated herein by reference.

LIST OF REFERENCE SYMBOLS 10 server
11 switch
12 conduit network
13 data center (or network center)
20 meteorological agency device
30 local government devices
100 drive unit
101 recording medium
102 auxiliary storage unit
103 memory unit
104 CPU
105 interface unit
110 operation center
111 controller
112 disaster area estimator
113 evaluator
114 optimal storage form calculator
115 communicator
116 disaster area storage
117 network information storage
141 conditional branch determiner
142 physical-to-logical mapping unit
143 optimum calculator
B bus
N1 physical network

The invention claimed is:

1. A storage form searching device comprising:
processing circuitry configured to
calculate a failure rate of each physical link constituting a physical network based on information representing a disaster-affected area; and
search for a storage form for one or more stored networks stored in a logical network configured by using the physical network, wherein the storage form makes a cut-off rate calculated based on the failure rate of said each physical link smaller,
wherein the processing circuitry is configured to search for the storage form that is optimum with respect to an objective being a mean value of cut-off rates of the one or more stored networks; a weighted sum of the mean value and a maximum value; or a mean value over a specific subset of the one or more stored networks.

2. The storage form searching device as claimed in claim 1, wherein the processing circuitry is configured to extract one or more combinations from among all combinations of presence or absence of the failure in said each physical link, the one or more combinations making the one or more stored network disconnected, and based on the failure rate of said each physical link, obtain a total sum of occurrence probabilities of the extracted one or more combinations, to calculate cut-off rates of the one or more stored networks.

3. The storage form searching device as claimed in claim 1, wherein the processing circuitry is configured to search for the storage form, based on modeling of generation time of one or more virtual machines accompanying the one or more stored networks when executing rearrangement of the one or more stored networks, under constraint conditions of a file size of the one or more virtual machines accompanying the one or more stored networks; information on the physical network and the logical network; and an upper limit value of transition time of the one or more virtual machines.

4. A storage form searching method executed by a computer, the method comprising:
calculating a failure rate of each physical link constituting a physical network based on information representing a disaster-affected area; and
searching for a storage form for one or more stored networks stored in a logical network configured by using the physical network, wherein the storage form makes a cut-off rate calculated based on the failure rate of said each physical link smaller,
wherein the searching searches for the storage form that is optimum with respect to an objective being a mean value of cut-off rates of the one or more stored networks; a weighted sum of the mean value and a maximum value; or a mean value over a specific subset of the one or more stored networks.

5. The storage form searching method as claimed in claim 4, wherein the searching extracts one or more combinations from among all combinations of presence or absence of the failure in said each physical link, the one or more combinations making the one or more stored network disconnected, and based on the failure rate of said each physical link, obtains a total sum of occurrence probabilities of the extracted one or more combinations, to calculate cut-off rates of the one or more stored networks.

6. The storage form searching method as claimed in claim 4, wherein the searching searches for the storage form, based on modeling of generation time of one or more virtual machines accompanying the one or more stored networks when executing rearrangement of the one or more stored networks, under constraint conditions of a file size of the one or more virtual machines accompanying the one or more stored networks; information on the physical network and the logical network; and an upper limit value of transition time of the one or more virtual machines.

7. A non-transitory computer-readable recording medium having a program stored thereon for causing a computer to execute a storage form searching method comprising:
    calculating a failure rate of each physical link constituting a physical network based on information representing a disaster-affected area; and
    searching for a storage form for one or more stored networks stored in a logical network configured by using the physical network, wherein the storage form makes a cut-off rate calculated based on the failure rate of said each physical link smaller,
    wherein the searching searches for the storage form that is optimum with respect to an objective being a mean value of cut-off rates of the one or more stored networks: a weighted sum of the mean value and a maximum value; or a mean value over a specific subset of the one or more stored networks.

8. The storage form searching device as claimed in claim 1, wherein the cut-off rate is a probability of a stored network transitioning into a state in which a connection path between any two nodes of the stored network is lost due to an occurrence of a failure of a certain physical link or links of the physical network.

\* \* \* \* \*